US012668107B2

(12) United States Patent
Fukada et al.

(10) Patent No.: US 12,668,107 B2
(45) Date of Patent: Jun. 30, 2026

(54) SUNROOF MECHANICAL ASSEMBLY AND SUNROOF DEVICE

(71) Applicant: AISIN (SUZHOU) TECHNICAL CENTER CO.,LTD., Suzhou (CN)

(72) Inventors: Ryuta Fukada, Suzhou (CN); Jie Feng Zhang, Suzhou (CN)

(73) Assignee: AISIN (SUZHOU) TECHNICAL CENTER CO., LTD., Suzhou (CN)

( * ) Notice: Subject to any disclaimer, the term of this patent is extended or adjusted under 35 U.S.C. 154(b) by 363 days.

(21) Appl. No.: 18/474,392

(22) Filed: Sep. 26, 2023

(65) Prior Publication Data

US 2024/0239162 A1 Jul. 18, 2024

(30) Foreign Application Priority Data

Jan. 16, 2023 (CN) .......................... 202320117995.4

(51) Int. Cl.
 *B60J 7/043* (2006.01)
 *B60J 7/057* (2006.01)
(52) U.S. Cl.
 CPC ............. *B60J 7/0435* (2013.01); *B60J 7/057* (2013.01)
(58) Field of Classification Search
 USPC ............... 296/216.01–216.05, 221, 222, 223
 See application file for complete search history.

(56) References Cited

U.S. PATENT DOCUMENTS

| | | | | |
|---|---|---|---|---|
| 4,877,285 A | * | 10/1989 | Huyer | B60J 7/0435 |
| | | | | 296/216.03 |
| 4,995,665 A | * | 2/1991 | Ichinose | B60J 7/05 |
| | | | | 296/213 |
| 5,020,849 A | * | 6/1991 | Schlapp | B60J 7/05 |
| | | | | 296/223 |
| 7,828,376 B2 | * | 11/2010 | Nellen | B60J 7/0435 |
| | | | | 296/216.03 |
| 11,577,588 B2 | * | 2/2023 | van Boxtel | E05D 15/00 |
| 2022/0410677 A1 | | 12/2022 | Hu et al. | |

FOREIGN PATENT DOCUMENTS

| | | |
|---|---|---|
| CN | 211617402 U | 10/2020 |
| JP | 5-50856 | 3/1993 |
| JP | 10-29433 | 2/1998 |

OTHER PUBLICATIONS

Japanese Office Action issued Apr. 16, 2024 in corresponding Japanese Patent Application No. 2023-152356 (with English translation), 7 pages.

* cited by examiner

*Primary Examiner* — Roger L Pang
(74) *Attorney, Agent, or Firm* — Oblon, McClelland, Maier & Neustadt, L.L.P.

(57) ABSTRACT

A sunroof assembly includes a panel supporting part to support a movable panel in a vehicle width direction; a slider supported on a guide rail; and a link. One end of the link is rotatably connected to the panel supporting part, and the other end has a first guided part. The first guided part movable in a first guide groove of the slider. The link includes a first rotating shaft part between one end and the other end, which is supported on the guide rail in a way that is movable in the front-rear direction of the vehicle. The link rotating around the first rotating shaft part when the link rotates around the first rotating shaft part, and an end of the panel supporting part connected to the link is displaced in an up-down direction of the vehicle.

7 Claims, 4 Drawing Sheets

(a)

(b)

(c)

SUNROOF MECHANICAL ASSEMBLY AND SUNROOF DEVICE

FIELD OF THE DISCLOSURE

The disclosure relates to a sunroof mechanical assembly and a sunroof device, in particular to a sunroof mechanical assembly for moving a movable panel of a sunroof device of a vehicle.

BACKGROUND

In the past, it has been known that there is a sunroof mechanical assembly in patent literature 1, which is used to move a movable glass of a sunroof device. The movable glass opens and closes an opening part of a roof, and the sunroof mechanical assembly has a glass supporting bar for supporting the movable glass and a link for connecting the glass supporting rod and a slider.

The sunroof mechanical assembly drives the slider to lift and move the link, thereby lifting the movable glass and moving it in a front-rear direction of the vehicle.

CITATION LIST

Patent Literature

Patent Literature 1

Chinese patent application publication No. CN211617402U

SUMMARY

In the sunroof mechanical assembly of the patent literature 1 mentioned above, one end of the link is connected to the glass support bar, and the other end is connected to the slider. When the slider is driven to move in the front-rear direction of the vehicle, the slider drives the link to rotate around a connection part between the link and the slider. Therefore, when the slider moves in a direction that lifts the movable glass, the link stands up around the connecting part with the slider, resulting in a larger range of movement of the link (i.e., an entire length of the link). Therefore, in order to ensure the movement of the link, a guide rail of the sunroof device needs to increase the height to match with the lifting of the link. In order to ensure the strength while the link is lifted, corresponding reinforcement components or the like need to be installed in a sliding part of the guide rail, which leads to an increase in the width of the sliding part. Therefore, it is not conducive to miniaturization of the sunroof device and it results in a smaller ventilation area based on the size of movable glass.

The present disclosure is made in view of the above problems, with the aim of providing a sunroof mechanical assembly that can reduce the size of the guide rails of the sunroof device to achieve miniaturization of the guide rails.

In order to achieve the above objectives, the sunroof mechanical assembly for moving a movable panel of a sunroof device, comprising: a panel supporting part that extends in a front-rear direction of a vehicle to support an edge of the movable panel in a vehicle width direction; a slider that is supported on a guide rail of the sunroof device movably along the front-rear direction of the vehicle; and a link, one end of which in the front-rear direction is rotatably connected to the panel supporting part, and the other end of which in the front-rear direction of the vehicle has a first guided part, the first guided part being embedded in a first guide groove of the slider and being movable relatively in the first guide groove, the link further has a first rotating shaft part between one end and the other end thereof, which is supported on the guide rail in a way that is movable in the front-rear direction of the vehicle, and the link can rotate around the first rotating shaft part, when the link rotates around the first rotating shaft part, an end of the panel supporting part connected to the link is displaced in an up-down direction of the vehicle.

According to this structure, compared to the way the link rotates around a connecting part with the slider, it can reduce the movement range of the link in the up-down direction, thus reducing the height of the guide rails for the link and slider to move, and limiting the movement of the link to a limited space. Moreover, since the first rotating shaft part is disposed between the front and rear ends of the link, supporting the first rotating shaft part by the guide rail can effectively support the link, thereby eliminating the need for reinforcement members or the like to be disposed on the guide rail for matching with the link. Therefore, the size of the guide rail in the vehicle width direction can also be reduced. As a result, it is possible to achieve miniaturization of the guide rails of the sunroof device.

In the sunroof mechanical assembly of the present disclosure, it is preferred that the first guide groove has a horizontal portion extending along the front-rear direction of the vehicle and a descending portion extending downwards from the horizontal portion at one end of the slider near the link, when the first guided part moves downwards in the descending portion, the link rotates around the first rotating shaft part to lift one end of the panel supporting part.

According to this structure, the link can be tilted due to the descending portion, that is, a part of the lifted height of the link coincides with the height of the slider. Therefore, compared to the way where the link is directly connected to a slider without any guide grooves, it can further reduce the height of the guide rails and further achieve miniaturization of the guide rails.

In the sunroof mechanical assembly of the present disclosure, it is preferred to further comprising a fixed block, which is fixed to the guide rail and is located on an opposite side to the slider relative to the link in the front-rear direction of the vehicle, and a limiting part being disposed on the fixed block, the link further has a limited part at one end thereof, which is configured to limit further movement of the link towards the fixed block by engaging with the limiting part.

According to this structure, it is possible to control the position of the sunroof device when closed in a simple way.

In the sunroof mechanical assembly of the present disclosure, it is preferred that the link and the slider are a front link and a front slider located at the front of the panel supporting part in the front-rear direction of the vehicle, the sunroof mechanical assembly further has a rear slider and a rear link located at the rear of the panel supporting part in the front-rear direction of the vehicle, the rear link connects the rear slider and the panel supporting part.

According to this structure, the panel supporting part can be supported from both the front and rear ends, thereby improving the rigidity of the panel supporting part.

In the sunroof mechanical assembly of the present disclosure, it is preferred that a rear end of the rear link in the front-rear direction of the vehicle is rotatably connected to the panel supporting part, and a front end thereof in the front-rear direction of the vehicle is movably supported on the guide rail through a second rotating shaft part, and the rear link is configured to rotatable around the second rotating shaft part, the rear link further has a second guided part embedded in a second guide groove of the rear slider and configured to be relatively movable in the second guide groove, when the rear link rotates around the second rotating shaft part, as the second guided part moves relatively in the second guide groove, the rear end of the panel supporting part connected to the rear link is displaced in the up-down direction of the vehicle.

In the sunroof mechanical assembly of the present disclosure, it is preferred that the second guide groove has a first portion and a second portion each extending horizontally, and a third portion connecting the first portion and the second portion, the second portion being located above and in front of the first portion, the first portion, the second portion, and the third portion are configured so that when the second guided part moves from the first portion to the second portion through the third portion, the rear link rotates around the second rotating shaft part to lift the rear end of the panel supporting part.

According to this structure, it is possible to lift the rear end of the panel support solely by the movement of the rear slider 60, without the need for setting other structures or components in the guide rails of the sunroof device to lift the rear end of the panel supporting part. Therefore, it is possible to reduce the number of components and further achieve miniaturization of the guide rails.

A sunroof device of the present disclosure comprises a movable panel disposed on a roof and opening and closing an opening of the roof; a pair of guide rails arranged at edges on both sides in a vehicle width direction of the opening and each extending along a front-rear direction of the vehicle; and the above sunroof mechanical assembly respectively disposed on each guide rail.

DETAILED DESCRIPTION

Below, based on the drawings, the preferred embodiments of the present disclosure will be explained.
(Structure of a Sunroof Mechanical Assembly)

Figure 1:
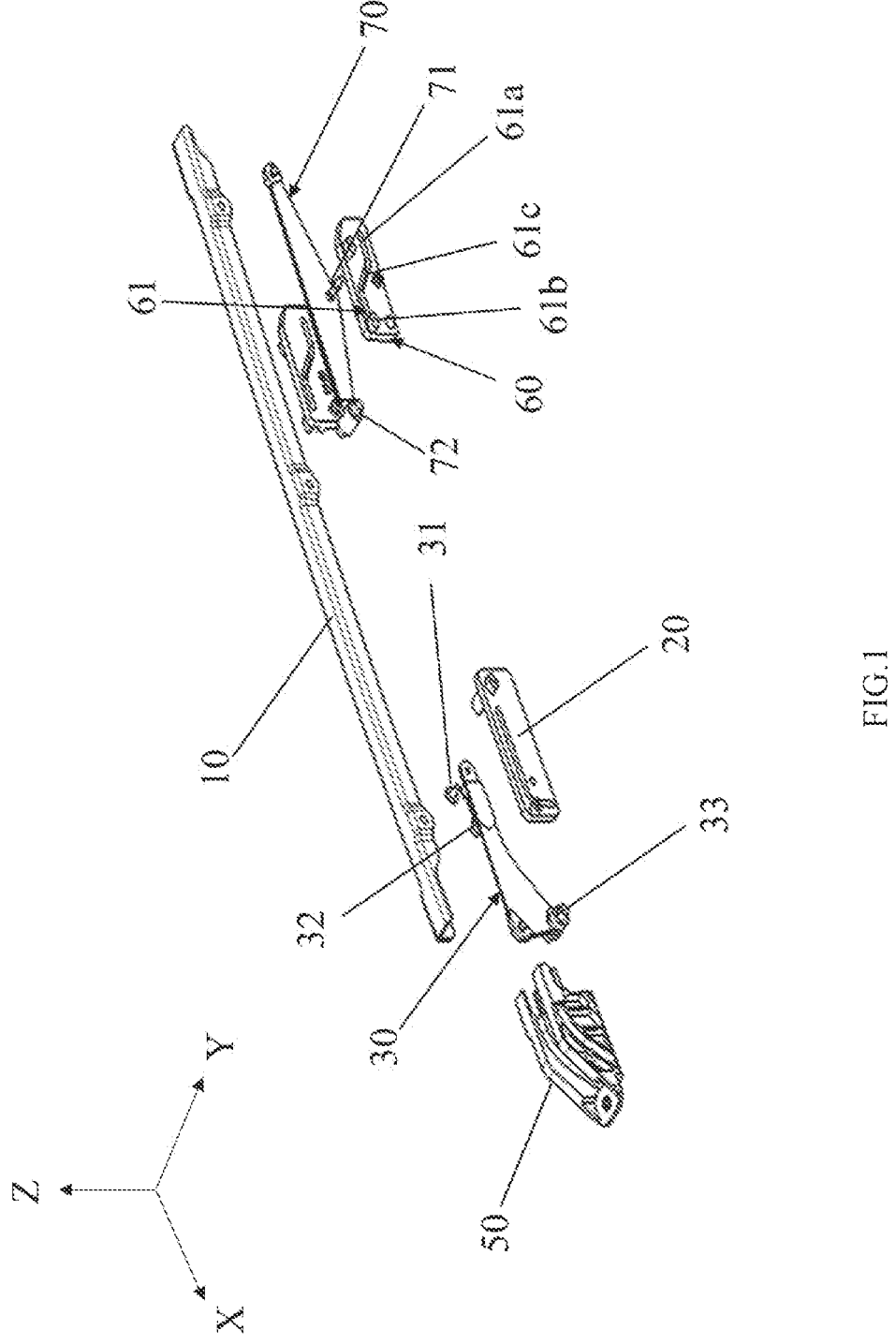
FIG. 1 is a perspective exploded view showing a sunroof mechanical assembly of the present disclosure.
Figure 2:
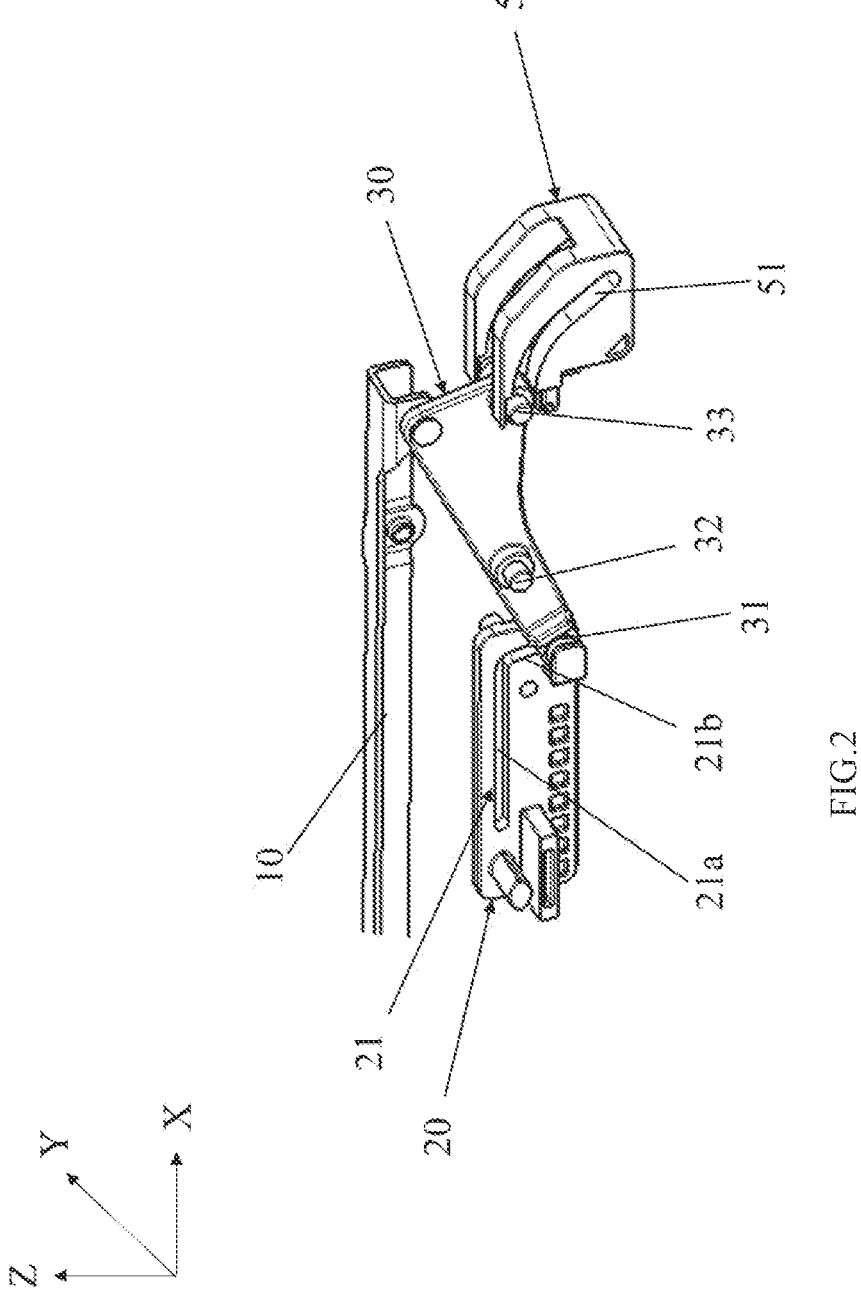
FIG. 2 is a perspective view showing main parts of the sunroof mechanical assembly of the present disclosure.
Figure 3:
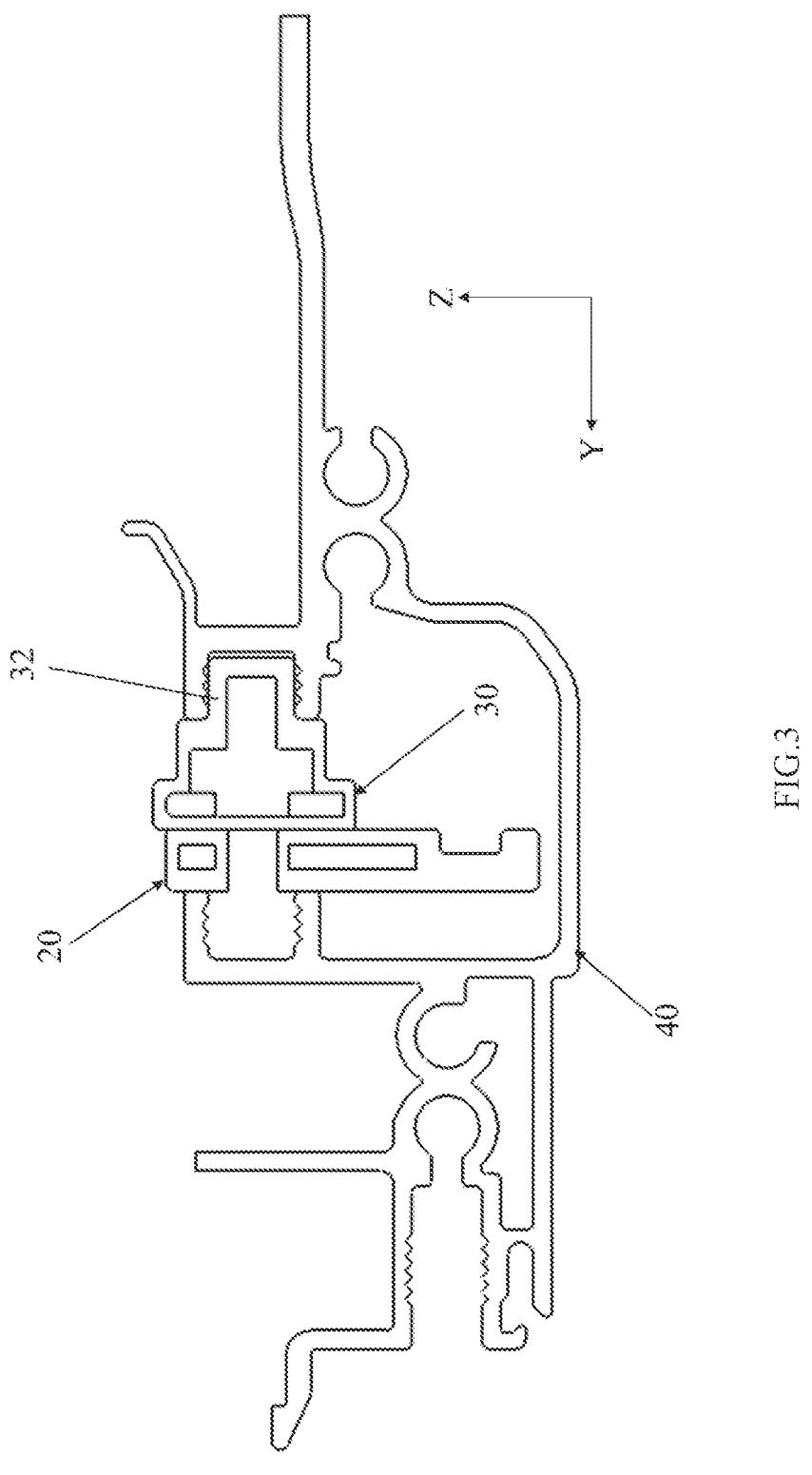
FIG. 3 is a cross-sectional view showing the sunroof mechanical assembly of the present disclosure.

FIG. 1 is a perspective exploded view showing a sunroof mechanical assembly of the present disclosure. FIG. 2 is a perspective view showing main parts of the sunroof mechanical assembly of the present disclosure. FIG. 3 is a cross-sectional view showing the sunroof mechanical assembly of the present disclosure. In addition, in the drawings, a direction of arrow X represents a front-rear direction of a vehicle, in which a positive direction represents the front of the vehicle; a direction of arrow Y represents a vehicle width direction, in which a positive direction represents a left side of the vehicle; and a direction of arrow Z represents an up-down direction of the vehicle, in which a positive direction represents an upper side of the vehicle. Moreover, in the description of the present disclosure, expressions about the directions such as "up", "down", "left", "right", "front", "rear" refer to the directions of the vehicle in the view of a driver sitting in a driver's seat.

Although not shown, a sunroof device equipped with the sunroof mechanical assembly according to this embodiment is installed on a roof. The sunroof device has a movable panel, which is disposed on the roof and opens and closes an opening of the roof, and a pair of guide rails 40 (see FIG. 3), which are arranged at edges on both sides in the vehicle width direction Y of the opening and each extends along a front-rear direction Z of the vehicle. The sunroof mechanical assembly is configured to move the movable panel of the sunroof device. In this embodiment, it is provided that the opening of the roof is opened when the movable panel moves backwards. Moreover, in the following explanation, only the sunroof mechanical assembly on the right side of the vehicle width direction Y is shown, and in fact, the structure of the sunroof mechanical assembly on the left side is the same therewith.

As shown in FIGS. 1-3, the sunroof mechanical assembly comprising: a panel supporting part 10, which extends in the front-rear direction X of the vehicle to support an edge of the movable panel in the vehicle width direction Y; a front slider 20, which is supported on the guide rail 40 of the sunroof device movably along the front-rear direction X of the vehicle; and a front link 30, a front end of which in the front-rear direction X of the vehicle is rotatably connected to the panel supporting part 10, and a rear end of which in the front-rear direction X of the vehicle has a first guided part 31 embedded in a first guide groove 21 of the front slider 20 and being movable relatively in the first guide groove 21. In this embodiment, the first guided part 31 is a pin embedded into the first guide groove 21 through a hole formed at the rear end of the front link 30. The first guide groove 21 has a horizontal portion 21*a* extending along the front-rear direction X of the vehicle and a descending portion 21*b* extending downwards from the horizontal portion 21*a* at a front end of the front slider 20 near the front link 30.

In addition, the front link 30 further has a first rotating shaft part 32 between the front end and the rear end thereof. The first rotating shaft part 32 is supported on the guide rail 40 of the sunroof device in a way that is movable in the front-rear direction X of the vehicle, and the front link 30 can rotate around the first rotating shaft part 32. When the front link 30 rotates around the first rotating shaft part 32, a front end of the panel supporting part 10 is displaced in the up-down direction Z of the vehicle. In this embodiment, the first rotating shaft portion 32 is a protrusion protruding from the front link 30 towards the vehicle width direction Y.

In addition, as shown in FIGS. 1 and 2, the sunroof mechanical assembly further comprising a fixed block 50, which is fixed to the guide rail 40 of the sunroof device and is located on an opposite side to the front slider 20 relative to the front link 30 in the front-rear direction X of the vehicle, that is, the fixed block 50 is located at the front of the front link 30 in the front-rear direction X of the vehicle. A limiting part 51 is disposed on the fixed block 50. As shown in FIG. 2, the fixed block 50 is composed of two wall parts arranged in the vehicle width direction Y, which are separated by a gap for inserting the front link 30. The limiting part 51 is respectively formed on each of the two wall parts as a guide groove that slopes downward and forward as it goes down. At the front end of the front link 30, there is also a limited part 33, which is a protrusion protruding from the front link 30 towards both sides of the vehicle width direction Y. The limited part 33 is configured to limit a forward movement of the front link 30 by engaging with the limiting part 51, that is, to limit the movement of the front link 30 in a closing direction (in this embodiment, in the front) in which the movable panel closes the opening of the roof. As an embodiment, for example, when the limited part 33 moves to the bottom of the limiting part 51, the forward movement of the movable panel is completely restricted.

The sunroof mechanical assembly further has a rear slider 60 and a rear link 70 located at the rear of the panel supporting part 10 in the front-rear direction X of the vehicle. The rear link 70 connects the rear slider 60 and the panel supporting part 10. Specifically, a rear end in the front-rear direction X of vehicle of the rear link 70 is rotatably connected to the panel supporting part 10, and a front end thereof in the front-rear direction X of the vehicle is movably supported on the guide rail 40 of the sunroof device through a second rotating shaft part 72, and the rear link 70 can rotate around the second rotating shaft part 72. The rear link 70 further has a second guided part 71, which is embedded in a second guide groove 61 disposed on the rear slider 60 and can move relatively in the second guide groove 61. In this embodiment, the second guided part 71 is a protrusion protruding from the rear link 70 towards the rear slider 60, and the second rotating shaft part 72 is a protrusion protruding from the front end of the rear link 70 towards the vehicle width direction Y.

As shown in FIG. 1, the second guide groove 61 has a first portion 61a and a second portion 61b each extending horizontally, and a third portion 61c connecting the first portion 61a and the second portion 61b. The second portion 61b is located above and in front of the first portion 61a. When the rear link 70 rotates around the second rotating shaft part 72 as the second guided part 71 moves relatively in the second guide groove 61, the rear end of the panel supporting part 10 connected to the rear link 70 is displaced in the up-down direction Z of the vehicle.

Action of the Sunroof Mechanical Assembly

Figure 4:
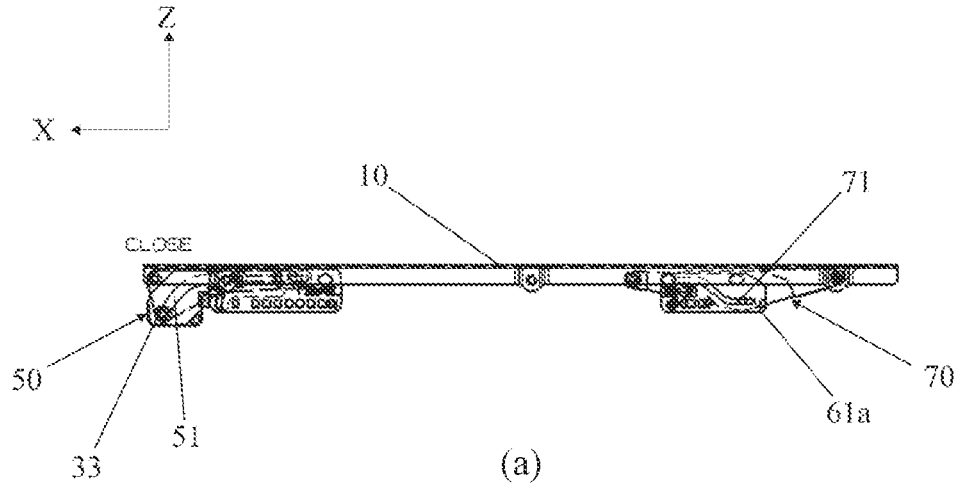
FIG. 4 is a front view illustrating an action of the sunroof mechanical assembly of the present disclosure upon opening a movable panel.
Figure 4:
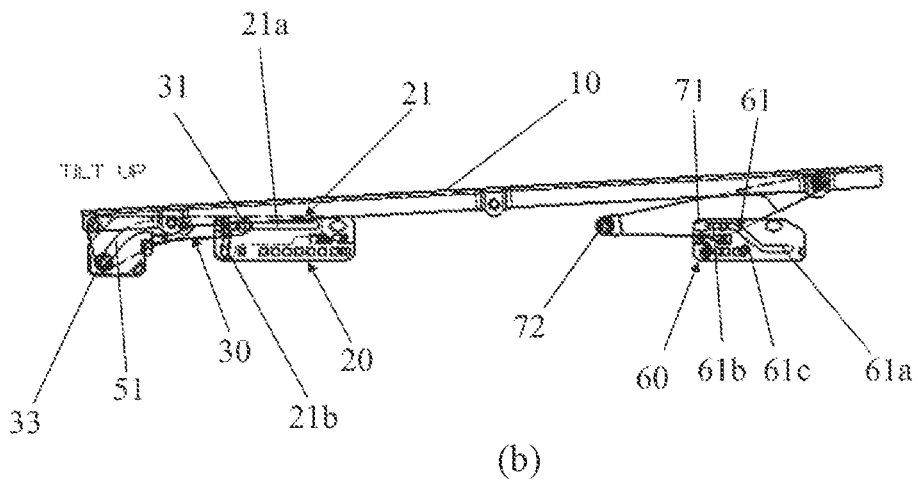
Figure 4:
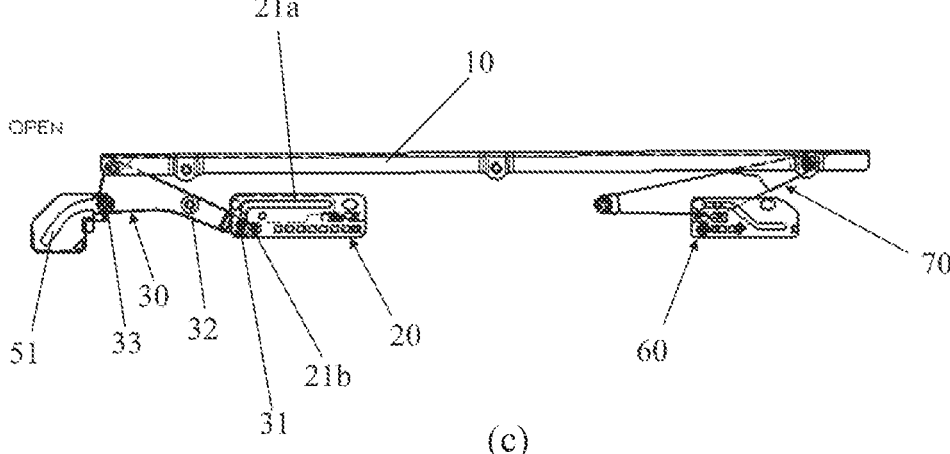

Below, FIG. 4 is referred to explain the action of the sunroof mechanical assembly.

FIG. 4 is the front view illustrating the action of the sunroof mechanical assembly of the present disclosure upon opening the movable panel. Wherein, (a) in FIG. 4 represents the state when the movable panel is completely closed, (b) in FIG. 4 represents the state when the sunroof mechanical assembly lifts the rear end of the movable panel to become a tilt up mode, and (c) in FIG. 4 represents the state when the sunroof mechanical assembly opens the movable panel.

As shown in (a) of FIG. 4, when the movable panel is fully closed, the front link 30 is fully inserted between the two wall parts of the fixed block 50, so that the limited part 33 abuts against the bottom of the limiting part 51. In addition, the second guided part 71 of the rear link 70 is located at the rear end of the first portion 61a of the second guide groove 61 in the rear slider 60.

As shown in (b) of FIG. 4, when disposing the sunroof device to the tilt up mode, the front slider 20 and the rear slider 60 are driven respectively to move towards the rear of the vehicle along the guide rail 40 (see FIG. 3). At this time, the second guided part 71 of the rear link 70 moves upwards from the first portion 61a to the second portion 61b through the third portion 61c along the second guide groove 61. Accompanied with this, the rear link 70 rotates around the second rotating shaft portion 72 to lift the rear end of the panel supporting part 10. In addition, as the front slider 20 moves towards rearwards along the guide rail 40, the first guided part 31 of the front link 30 moves in the horizontal portion 21a of the first guide groove 21 and has not yet entered the descending portion 21b. Therefore, the position of the front link 30 remains unchanged, and the limited part 33 is still in a state of abutting against the bottom end of the limited part 51. In this way, the movable panel becomes the tilt up state with the rear end raised and the front end kept closed, for example, allowing ventilation from the rear end of the opening.

As shown in (c) of FIG. 4, when the front slider 20 is further driven from the ventilation mode to move towards the rear of the vehicle, the first guided part 31 of the front link 30 enters the descending portion 21b from the horizontal portion 21a, so that the front link 30 rotates around the first guided part 31, and accompanied with this, the limited part 33 moves up along the limiting part 51, so that the front end of the panel supporting part 10 is lifted by the front link 30, making the front and rear ends of the panel supporting part 10 at the same height. In the state of (c) in FIG. 4, when the front slider 20 and the rear slider 60 are further driven to move towards the rear of the vehicle, the first rotating shaft part 32 of the front link 30 and the second rotating shaft 72 of the rear link 70 move along the guide rail 40 of the sunroof device, thereby maintaining the lifting state of the movable panel and moving towards the rear of the vehicle, thereby fully opening the opening of the roof.

Effect of Sunroof Mechanical Assembly

Below, the effect of the sunroof mechanical assembly of this embodiment will be explained.

As mentioned above, in the sunroof mechanical assembly of this embodiment, the front slider 20 causes the front link 30 to rotate around the first rotating shaft part 32. Therefore, compared to the way the front link rotates around its connecting part with the front slider, it can reduce the movement range of the front link in the up-down direction Z, thereby reducing the height of the guide rail for the front link and front slider to move, and limiting the movement of the front link 30 to a limited space. Moreover, since the first rotating shaft part 32 is located between the front and rear ends of the front link 30, supporting the first rotating shaft part 32 by the guide rail 40 can effectively support the front link 30, thereby eliminating the need for reinforcement members or the like to be disposed on the guide rail for matching with the front link. Therefore, the size of the guide rail in the vehicle width direction Y can also be reduced. As a result, it is possible to achieve miniaturization of the guide rails of the sunroof device.

In addition, in this embodiment, the first guide groove 21 of the front slider 20 is a structure with the horizontal portion 21a and the descending portion 21b. Therefore, when the first guided part 31 of the front link 30 moves downwards in the descending portion 21b, the front end of the front link 30 can be lifted to a height corresponding to the height of the descending portion 21b, that is, a part of the lifted height of the front end of the front link 30 coincides with the height of the front slider 20. Therefore, compared to the way where the front link 30 is directly connected to a front slider without any guide grooves, it can further reduce the height of the guide rails and further achieve miniaturization of the guide rails.

In addition, in this embodiment, there is also a fixed block 50, on which a limiting part 51 is disposed. The movement of the front link 30 in the closing direction in which the movable panel closes the opening of the sunroof device is limited by the engagement of the limiting part 51 with the limited part 33 of the front link 30. Therefore, it is possible to control the position of the sunroof device when closed in a simple way.

In addition, in this embodiment, the sunroof mechanical assembly has a front slider 20 and a front link 30, as well as a rear slider 60 and a rear link 70 at both ends in the front-rear direction of the panel supporting part 10. Therefore, the panel supporting part 10 can be supported from both the front and rear ends, thereby improving the rigidity of the panel supporting part 10.

In addition, in this embodiment, the rear slider 60 has a second guide groove 61, and the second guided part 71 of the rear link 70 is embedded in the second guide groove 61 and can move relatively in the second guide groove 61. Moreover, the second guide groove 61 has a first portion 61*a*, a second portion 61*b*, and a third portion 61*c*. When the second guided part 71 moves from the first portion 61*a* through the third portion 61*c* to the second portion 61*b*, the rear link 70 lifts the rear end of the panel supporting part 10. By disposing the rear slider 60 and the rear link 70 like this, it is possible to lift the rear end of the panel supporting part 10 solely by the movement of the rear slider 60, without the need for setting other structures or components in the guide rails of the sunroof device to lift the rear end of the panel supporting part 10. Therefore, it is possible to reduce the number of components and further achieve miniaturization of the guide rails.

Other Embodiments

The present disclosure is not limited to the above embodiments, but can make the following modifications.

In the embodiment described above, the structure in which the front link 30 has a first rotating shaft part 32 disposed between the front and rear ends of the front link 30, and a first guided part 31 disposed at the rear end of the front link 30 which is embedded in the first guide groove 21 of the front slider 20, has been explained, but it is not limited to this. Alternatively, it can also be a structure that the rear link has a rotating shaft part disposed between the front and rear ends of the rear link, and a guided part disposed at the end of the rear link which is embedded in a guide groove of the rear slider. That is to say, according to the front-rear position of the movable panel on the roof and the opening and closing direction of the movable panel, the structure of the front link and the front slider described in the above preferred embodiment can also be applied to the rear of the panel supporting part to use as the rear link and the rear slider.

In the embodiment described above, the first guided part 31 is explained as a pin embedded into the first guide groove 21 through a hole formed at the rear end of the front link 30, but it is not limited to this. The first guided part 31 can instead be a protrusion protruding from the front link 30 towards the front slider 20.

In the embodiment described above, the first rotating shaft part 32 is explained as a protrusion protruding from the front link 30, but it is not limited to this. The first rotating shaft portion 32 can also be a pin embedded into the guide rail 40 through a hole formed in the front link 30. Similarly, the second guided part 71 and the second rotating shaft part 72 can also be pins inserted into the holes formed in the rear link 70.

In the embodiment described above, the structure in which the first guide groove 21 has a horizontal portion 21*a* and a descending portion 21*b*, and the limiting part 51 of the fixed block 50 is a guide groove, has been explained, but it is not limited to this. The first guide groove 21 may also not have the descending portion 21*b*, but only rotate the front link 30 by the way in which the limiting part 51 of the fixed block 50 slopes downward and forward as it goes down. Alternatively, the limiting part 51 may not be a guide groove, but a stop block that abuts the limited part 33 from the front, and only rotates the front link 30 based on the trajectory of the first guide groove 21 on the front slider 20. That is, as long as the front end of the panel supporting part 10 connected to the front link 30 can be displaced in the up-down direction Z of the vehicle with the movement of the front slider 20, various structures can be adopted.

In the embodiment described above, the fixed block 50 restricts the link 30 from moving in the closing direction of the movable panel by the engagement of the limiting part 51 and the limited part 33 of the front link 30, but it is not limited to this. The fixed block 50 can also directly abut against the front slider 20 from the front to limit its movement in the closing direction of the movable panel, rather than limiting the front link 30.

In the embodiment described above, the structure in which the second guide groove 61 has a first portion 61*a*, a second portion 61*b*, and a third portion 61*c* has been explained, but it is not limited to this. The second guide groove 61 can also be of other shapes, and any shape of the guide groove known in the field of sunroof that can guide the guided part on the link and cause one end of the panel supporting part 10 to displace in the up-down direction of the vehicle can be adopted.

Above, the disclosure has been explained with reference to specific examples. However, the present disclosure is not limited to these specific examples. The design obtained by technical personnel in this field by applying appropriate design changes to the specific examples, as long as they have the characteristics of the present disclosure, they are also included in the scope of the present disclosure.

REFERENCE SIGNS LIST

10 panel supporting part
20 front slider
21 first guide groove
30 front link
31 first guided part
32 first rotating shaft part
33 limited part
40 guide rail
50 fixed block
51 limiting part
60 rear slider
61 second guide groove
70 rear link
71 second guided part
72 second rotating shaft part

What is claimed is:

1. A sunroof mechanical assembly for moving a movable panel of a sunroof device, comprising:

a panel supporting part that extends in a front-rear direction of a vehicle to support an edge of the movable panel in a vehicle width direction;

a slider that is supported on a guide rail of the sunroof device movably along the front-rear direction of the vehicle; and a link, one end of which in the front-rear direction is rotatably connected to the panel supporting part, and the other end of which in the front-rear direction of the vehicle has a first guided part, the first guided part being embedded in a first guide groove of the slider and being movable relatively in the first guide groove, the link further has a first rotating shaft part between one end and the other end thereof, which is directly supported on the guide rail in a way that is movable in the front-rear direction of the vehicle, and the link can rotate around the first rotating shaft part, when the link rotates around the first rotating shaft part, an end of the panel supporting part connected to the link is displaced in an up-down direction of the vehicle.

2. The sunroof mechanical assembly according to claim 1, wherein, the link and the slider are a front link and a front slider located at the front of the panel supporting part in the front-rear direction of the vehicle, the sunroof mechanical assembly further has a rear slider and a rear link located at the rear of the panel supporting part in the front-rear direction of the vehicle, the rear link connects the rear slider and the panel supporting part.

3. The sunroof mechanical assembly according to claim 2, wherein, a rear end of the rear link in the front-rear direction of the vehicle is rotatably connected to the panel supporting part, and a front end thereof in the front-rear direction of the vehicle is movably supported on the guide rail through a second rotating shaft part, and the rear link is configured to rotatable around the second rotating shaft part, the rear link further has a second guided part embedded in a second guide groove of the rear slider and configured to be relatively movable in the second guide groove, when the rear link rotates around the second rotating shaft part, as the second guided part moves relatively in the second guide groove, the rear end of the panel supporting part connected to the rear link is displaced in the up-down direction of the vehicle.

4. The sunroof mechanical assembly according to claim 3, wherein, the second guide groove has a first portion and a second portion each extending horizontally, and a third portion connecting the first portion and the second portion, the second portion being located above and in front of the first portion, the first portion, the second portion, and the third portion are configured so that when the second guided part moves from the first portion to the second portion through the third portion, the rear link rotates around the second rotating shaft part to lift the rear end of the panel supporting part.

5. A sunroof device, comprising:

a movable panel disposed on a roof and opening and closing an opening of the roof;

a pair of guide rails arranged at edges on both sides in a vehicle width direction of the opening and each extending along a front-rear direction of the vehicle; and the sunroof mechanical assembly according to claim 1 disposed respectively on each guide rail.

6. A sunroof mechanical assembly for moving a movable panel of a sunroof device, comprising:

a panel supporting part that extends in a front-rear direction of a vehicle to support an edge of the movable panel in a vehicle width direction;

a slider that is supported on a guide rail of the sunroof device movably along the front-rear direction of the vehicle; and a link, one end of which in the front-rear direction is rotatably connected to the panel supporting part, and the other end of which in the front-rear direction of the vehicle has a first guided part, the first guided part being embedded in a first guide groove of the slider and being movable relatively in the first guide groove, the link further has a first rotating shaft part between one end and the other end thereof, which is supported on the guide rail in a way that is movable in the front-rear direction of the vehicle, and the link can rotate around the first rotating shaft part, when the link rotates around the first rotating shaft part, an end of the panel supporting part connected to the link is displaced in an up-down direction of the vehicle, wherein, the first guide groove has a horizontal portion extending along the front-rear direction of the vehicle and a descending portion extending downwards from the horizontal portion at one end of the slider near the link, when the first guided part moves downwards in the descending portion, the link rotates around the first rotating shaft part to lift one end of the panel supporting part.

7. A sunroof mechanical assembly for moving a movable panel of a sunroof device, comprising:

a panel supporting part that extends in a front-rear direction of a vehicle to support an edge of the movable panel in a vehicle width direction;

a slider that is supported on a guide rail of the sunroof device movably along the front-rear direction of the vehicle:

a link, one end of which in the front-rear direction is rotatably connected to the panel supporting part, and the other end of which in the front-rear direction of the vehicle has a first guided part, the first guided part being embedded in a first guide groove of the slider and being movable relatively in the first guide groove, the link further has a first rotating shaft part between one end and the other end thereof, which is supported on the guide rail in a way that is movable in the front-rear direction of the vehicle, and the link can rotate around the first rotating shaft part, when the link rotates around the first rotating shaft part, an end of the panel supporting part connected to the link is displaced in an up-down direction of the vehicle;

a fixed block, which is fixed to the guide rail and is located on an opposite side to the slider relative to the link in the front-rear direction of the vehicle, and a limiting part being disposed on the fixed block, the link further has a limited part at one end thereof, which is configured to limit further movement of the link towards the fixed block by engaging with the limiting part.

\* \* \* \* \*